United States Patent
Gille et al.

(10) Patent No.: US 9,851,229 B2
(45) Date of Patent: Dec. 26, 2017

(54) DISTRIBUTOR VALVE HAVING AN INTEGRATED FLOW METER UNIT

(71) Applicant: Viega Technology GmbH & Co. KG, Attendorn (DE)

(72) Inventors: Marcel Gille, Attendorn (DE); Nadine Steinhanses, Lennestadt (DE); Detlev Schmitt, Drolshagen (DE); Reinhard Pilmeier, Haselbach (DE); Matthias Oischinger, Achslach (DE); Jörg Rosenthal, Reichshof-Eckenhagen (DE); Peter Buchner, Bogen (DE); Andreas Schneider, Finnentrop-Schönholthausen (DE)

(73) Assignee: Viega Technology GmbH & Co. KG, Attendorn (DE)

( * ) Notice: Subject to any disclaimer, the term of this patent is extended or adjusted under 35 U.S.C. 154(b) by 148 days.

(21) Appl. No.: 14/766,683

(22) PCT Filed: Nov. 6, 2013

(86) PCT No.: PCT/EP2013/073163
§ 371 (c)(1),
(2) Date: Aug. 7, 2015

(87) PCT Pub. No.: WO2014/121859
PCT Pub. Date: Aug. 14, 2014

(65) Prior Publication Data
US 2015/0369376 A1   Dec. 24, 2015

(30) Foreign Application Priority Data

Feb. 8, 2013 (DE) .................... 10 2013 002 118

(51) Int. Cl.
*G01F 1/28* (2006.01)
*F16K 5/04* (2006.01)
(Continued)

(52) U.S. Cl.
CPC .............. *G01F 1/28* (2013.01); *F16K 5/0407* (2013.01); *F16K 5/0414* (2013.01); *G01F 1/00* (2013.01); *G01F 1/053* (2013.01)

(58) Field of Classification Search
CPC ........... G01F 1/053; G01F 1/28; F16K 5/0414
See application file for complete search history.

(56) References Cited

U.S. PATENT DOCUMENTS 2,047,854 A  *  7/1936  Clymer .................... G01F 1/28
                                                    73/861.75
4,073,189 A       2/1978  Draper
(Continued)

FOREIGN PATENT DOCUMENTS

CN       201723210 U   *  1/2011
DE       19608780 A1       9/1996
(Continued)

*Primary Examiner* — Daniel J Colilla
(74) *Attorney, Agent, or Firm* — Rankin, Hill & Clark LLP

(57) ABSTRACT

A distribution valve with an integrated flowmeter unit, which exhibits a main flow channel, through which a medium can flow in a main flow direction, and a secondary flow channel branching from the latter. The distribution valve includes a distribution valve housing containing a main pipe, a first conduit pipe connection, a second conduit pipe connection and at least one branch lying in between. The main flow channel in the main pipe runs from the first conduit pipe connection to the second conduit pipe connection. The branch empties into a first housing part, which includes an outlet. The outlet of the first housing part empties into a second housing part, which accommodates a flowmeter body and includes an outlet that forms a third conduit pipe connection. The secondary flow channel runs from the at least one branch of the main pipe to the outlet of the second housing part.

20 Claims, 8 Drawing Sheets

Figure 1:
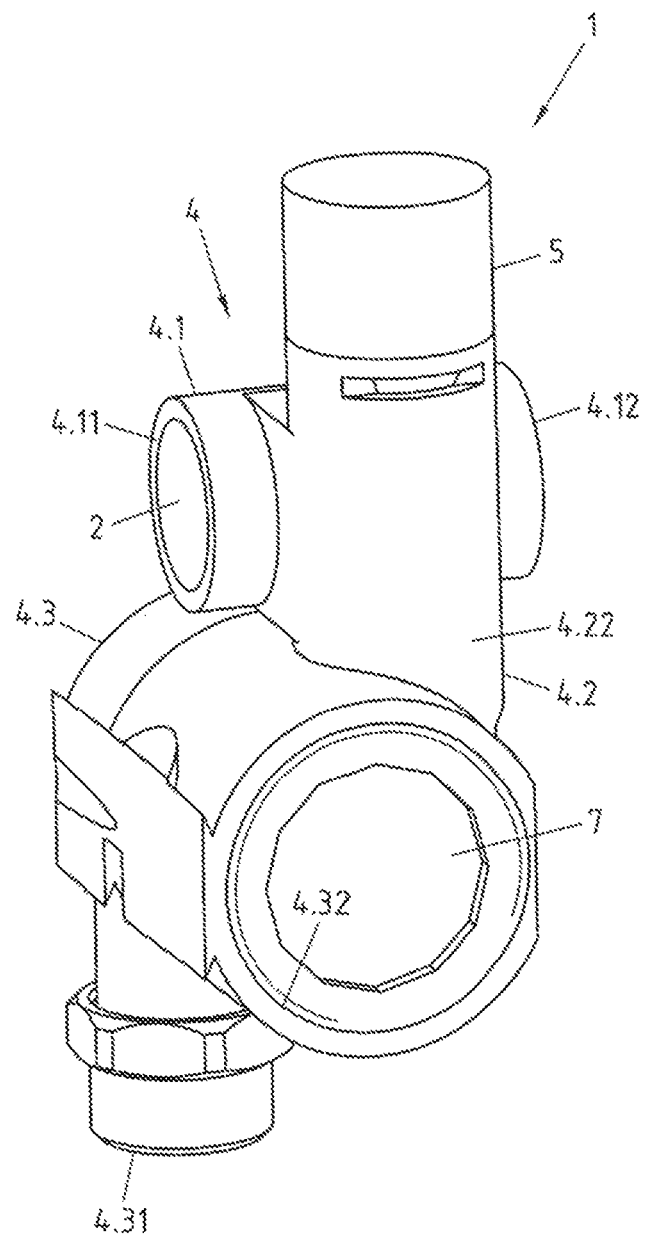

(51) Int. Cl.
*G01F 1/05* (2006.01)
*G01F 1/00* (2006.01)

(56) References Cited

U.S. PATENT DOCUMENTS

| | | | | |
|---|---|---|---|---|
| 5,406,979 A | * | 4/1995 | McHugh | A62C 35/68 116/274 |
| 5,890,515 A | | 4/1999 | Spiess et al. | |
| 6,325,098 B1 | | 12/2001 | Motta et al. | |
| 2004/0108002 A1 | | 6/2004 | Lumello | |
| 2005/0092103 A1 | | 5/2005 | Famos | |
| 2006/0196551 A1 | | 9/2006 | Fracchia | |
| 2007/0005002 A1 | * | 1/2007 | Millman | A61M 1/0058 604/30 |
| 2010/0307611 A1 | | 12/2010 | Straub et al. | |

FOREIGN PATENT DOCUMENTS

| | | | |
|---|---|---|---|
| DE | 20304841 U1 | * | 7/2003 |
| DE | 102009027106 A1 | | 1/2011 |
| EP | 0797080 A2 | | 9/1997 |
| EP | 1452837 A1 | | 9/2004 |
| EP | 1734346 B1 | | 6/2006 |
| EP | 1688713 A1 | | 8/2006 |
| JP | S57-113318 A | | 7/1982 |
| JP | 08233151 A | * | 9/1996 |
| WO | 00/07651 A1 | | 2/2000 |
| WO | 00/47959 A1 | | 8/2000 |
| WO | 02/16811 A1 | | 2/2002 |
| WO | 2009/100930 A1 | | 8/2009 |

* cited by examiner

Detail A

DISTRIBUTOR VALVE HAVING AN INTEGRATED FLOW METER UNIT

The present invention relates to a distribution valve with integrated flowmeter unit, which exhibits a main flow channel through which a medium can flow in a main flow direction and a secondary flow channel branching from the latter, with a distribution valve housing that contains a main pipe with a first conduit pipe connection, a second conduit pipe connection and at least one branch lying in between, wherein the main flow channel in the main pipe runs from the first conduit pipe connection to the second conduit pipe connection, a first housing part for accommodating at least one valve body, wherein the branch empties into the first housing part and establishes a fluid connection between the main pipe and first housing part, and wherein the first housing part exhibits an outlet, and a second housing part for accommodating a flowmeter body, with the valve body, with the flowmeter body and with a third conduit pipe connection.

For example, a distribution valve of the kind defined above is known from WO 2009/100930 A1. The known distribution valve exhibits a multipart distribution valve housing comprising a main pipe, a separate first housing part for accommodating a valve body and a separate second housing part for accommodating a flowmeter body. The first housing part is here flanged to the bottom side of the main pipe, wherein a fluid connection exists between the main pipe and first housing part. The second housing part is flanged oppositely to the upper side of the main pipe, wherein a fluid connection also exists between the main pipe and second housing part. The first housing part incorporates a valve body, and the second housing part incorporates a flowmeter body. The main pipe exhibits a first and second conduit pipe connection. Further provided between the two conduit pipe connections is a branch, which establishes the fluid connection between the main pipe and the first housing part. Finally provided is a third conduit pipe connection, which is a constituent of the first housing part, in which the valve body is situated. The valve body is a regulating spindle, which prescribes the maximum water quantity to exit the third conduit pipe connection by way of a lifting movement.

The distribution valve described above has a relatively complex structural design, and exhibits a plurality of separate components to be joined together. The assembly of the distribution valve is correspondingly complicated. Due to the plurality of components, the susceptibility to errors is also relatively high. In addition, the distribution valve is relatively difficult to seal given the numerous housing parts.

Also known from EP 0 797 080 A2 is a flow regulating valve with integrated flowmeter unit, which exhibits a housing comprised of a main pipe and first housing part, wherein the first housing part is used both to accommodate the valve body and to accommodate a flowmeter body. The valve is here designed as a regulating cock, which extends completely through the main pipe, and regulates the flow between an open position and closed position as a function of its position relative to the main pipe.

Proceeding from the prior art mentioned at the outset, an object of the present invention is to provide a distribution valve with a simpler construction.

In a distribution valve, in particular for a floor heating system, with integrated flowmeter unit, which exhibits a main flow channel through which a medium, for example water, can flow in a main flow direction, and a secondary flow channel branching from the latter, with a distribution valve housing that contains
- a main pipe with a first conduit pipe connection, a second conduit pipe connection and at least one branch lying in between, wherein the main flow channel in the main pipe runs from the first conduit pipe connection to the second conduit pipe connection,
- a first housing part for accommodating at least one valve body, wherein the branch empties into the first housing part and forms a fluid connection between the main pipe and first housing part, and wherein the first housing part exhibits an outlet, and
- a second housing part for accommodating a flowmeter body,
with the valve body,
with the flowmeter body and
with a third conduit pipe connection, for example which can be connected with a heating circuit,
the object derived and indicated above is achieved by virtue of the fact that
- the outlet of the first housing part empties into the second housing part, and establishes a fluid connection between the first housing part and second housing part,
- the second housing part exhibits an outlet that forms the third conduit pipe connection, and
- the secondary flow channel runs from the branch of the main pipe to the outlet of the second housing part.

The distribution valve according to the invention is characterized in that the entire regulating unit comprised of the first housing part and valve body along with the entire flow indicator unit comprised of the second housing part and flowmeter body are arranged downstream from the branch provided in the main pipe. The flow rate is regulated and the volumetric flow is measured and displayed in a single (shared) secondary flow channel, which begins in the branch of the main pipe. As a result, the main pipe only requires a single branch opening to a secondary flow channel running to the previously defined third conduit pipe connection by way of a flowmeter unit. With the distribution valve installed as intended, the second housing part is preferably situated under (behind) the first housing part and/or branch in the gravitational direction (gravitational acceleration direction), and/or the third conduit pipe connection is situated under (behind) the second housing part and/or first housing part and/or branch in the gravitational direction.

The construction of the distribution valve according to the invention is much simpler by comparison to prior art, which also markedly simplifies the production or assembly of the distribution valve. The latter is also easier to seal, since only one channel, namely the aforesaid secondary flow channel, now branches away from the main pipe.

The first and second conduit pipe connections can each be joined with a line system and/or several additional distribution valves. Accordingly, the present invention also relates to a connection device, in particular a line system, with one or more distribution valves, of which at least one distribution valve is designed according to the invention.

In an embodiment of the distribution valve according to the invention, the distribution valve housing has a single-piece, i.e., integral, design. In other words, the individual housing parts, meaning the main pipe, first housing part and second housing part, consist of a single piece (the parts cannot be detached from each other). In this way, the structural design of the distribution valve is simplified even further, and the risk of leaks is minimized, since there no longer are any locations between the housing parts that need to be sealed (because the housing parts are integrally joined together). In particular, the distribution valve housing and/or valve body and/or flowmeter body are made out of plastic, and preferably consist of an injection molded part. Given a single-piece distribution valve housing, the entire distribution valve housing is then a cohesive injection molded part. Given separate housing parts, the main pipe, first housing part and/or second housing part are separate injection molded parts. As mentioned, however, preference is given to the one-piece configuration of the distribution valve housing.

In particular, the valve body is a regulating cock, i.e., a body that can rotate around a first rotational axis and has a radial inlet opening and an in particular axial outlet opening.

An additional embodiment of the distribution valve according to the invention thus provides that a regulating cock that can rotate around a first rotational axis between a closed position and open position be furnished in the first housing part as a valve body. In the closed position, the regulating cock closes the connection between the main pipe and first housing part, while the connection is released in the open position, specifically in such a way as to yield a maximum outlet cross section or maximum flow. There are several or countless intermediate positions between the closed position and open position that the regulating cock can assume relative to the housing section, in which the outlet cross section and flow rate are less than in the open position.

The first housing part can be provided with at least one slit and/or at least one groove for accommodating a safety element, in particular a safety clamp. The latter can also be made out of plastic. The regulating cock can also be provided with at least one groove for accommodating the safety element. The safety element fixes the regulating cock in the first housing part in an axial direction (meaning the axial direction of the first housing part on which the first rotational axis also lies).

The regulating cock and first housing part can have situated between them a first sealing element, e.g., a first sealing ring, which in particular runs in the peripheral direction (peripheral direction of the regulating cock) and seals the first housing part away from the environment. Alternatively or additionally, a sealing element or sealing ring can also be provided on the interior side of the first housing part. A groove can be provided in the regulating cock and/or first housing part for accommodating the respective sealing ring.

Furthermore, an additional sealing element, e.g., another sealing ring, can be situated on the area of the surface of the regulating cock that closes the connection to the main pipe (the branch) in the closed position, so that no medium can pass from the main pipe into the first housing part in the closed position of the regulating cock.

The sealing elements or sealing rings can be joined both detachably or rigidly with the regulating cock, e.g., as known for 2-component plastic parts, or adhesively bonded, vulcanized, etc. Additionally or alternatively, the entire regulating cock can be covered or coated with an in particular elastic sealing material as the sealing element.

In yet another embodiment of the distribution valve according to the invention, the first housing part exhibits a wall with an (at least regionally) cylindrical surface on the interior, against which the regulating cock abuts on the interior, and along which the regulating cock can be guided. This wall or the interior cylindrical surface of the first housing part is also used to seal the interior of the first housing part away from the environment, in particular using the sealing elements described above, and grooves if needed.

In another embodiment, the wall of the first housing part exhibits an opening, which forms an inlet for the medium that can be branched away from the main pipe at the branch, in particular the water of the floor heating system, wherein the opening in the wall of the first housing part in particular corresponds, i.e., is identical or superposed, with an opening in the main pipe comprising the branch. Alternatively, a line segment can be provided between the opening in the wall of the first housing part and the opening in the main pipe as a connection between the main pipe and first housing part, wherein the branch is then formed by the opening in the main pipe together with the line segment.

As already indicated, the regulating cock in another embodiment exhibits a cock channel that extends from a radial opening in the regulating cock to an axial opening in the regulating cock, wherein there is an in particular complete alignment, i.e., overlap, between the axial opening in the regulating cock and the outlet of the first housing part, and between the radial opening in the regulating cock and the inlet of the first housing part, in the open position of the regulating cock, and the regulating cock closes the inlet of the first housing part completely, meaning liquid-tight, in the closed position of the regulating cock. "Liquid-tight" means that no liquid can pass through given a regular pressure or test pressure in the line system.

As mentioned, there are intermediate positions between the open position and closed position in which the radial opening in the regulating cock also aligns, i.e., overlaps, with the inlet of the first housing part, but the free cross section (flow cross section) is then smaller than in the open position, so that the flow rate is lower than in the open position.

The radial opening in the regulating cock has a uneven (i.e., not completely circular) and/or asymmetrical cross section, which in particular in the peripheral direction (peripheral direction of the regulating cock) tapers more toward one side than toward the other.

The opening preferably exhibits a first section with a round contour, in particular a contour that corresponds to at least half of a circle, preferably at least ⅔ of a circle, especially preferably at least ¾ of a circle, wherein the diameter of the circle ideally corresponds to the diameter of the opening of the first housing part, which forms the inlet for the medium that can be branched away the main pipe.

This first section of the opening is preferably adjoined by an in particular essentially slit-like second section, in which the edges of the opening move toward each other in the direction from the first section to the end of the second section. In particular, the edges of the opening in the second section have a largely or almost completely straight progression.

A misalignment is preferably provided in an axial direction of the regulating cock between the midpoint of the first section (i.e., the midpoint of the round contour of the first section in the case of a round contour) and the front end of the centerline of the second section. The front end of the centerline is defined as the point at which the centerline of the second section meets the peripheral line (or imagined circumference on which the round contour of the first section runs). The front end of the centerline of the second section is here offset in particular to the midpoint of the first section in a direction parallel to the first rotational axis, which faces away from the axial opening in the regulating cock. Therefore, if the rotational axis of the regulating cock runs in the gravitational direction (gravitational acceleration direction) with the distribution valve properly installed, and the second housing part is situated behind (under) the first housing part in the gravitational direction, the front end of the centerline of the second section is offset toward the midpoint of the first section opposite the gravitational direction. The entire second section preferably lies in the direction parallel to the first rotational axis, in particular the direction parallel to the first rotational axis and facing the axial opening in the regulating cock (with the distribution valve properly installed in the gravitational direction), in front of the midpoint of the first section, meaning above the midpoint of the first section.

As a result, the arrangement described above and the progression of the contour of the radial opening are provided with an especially streamlined design. In particular, a streamlined design is imparted to the contour of the radial opening by virtue of the fact that the medium flowing through the second (slit-like) section into the regulating cock is diverted directly downwardly toward the axial opening.

When twisting the regulating cock from the closed position in the direction of the open position, this causes an expansion of the flow cross section, which is measured in such a way that the increase in flow rate is approximately proportional to the angle of rotation. The maximum angle of rotation for the regulating cock, i.e., the angle of rotation between the closed position and open position, ranges in particular from 250° to 290°, preferably from 260° to 280°, and especially preferably measures 270°. The cross section of the radial opening in the regulating cock extends in particular over at least one fourth of the periphery of the regulating cock, preferably over at least one third of the periphery of the regulating cock, especially preferably over at least half of the periphery of the regulating cock. The angle of rotation for regulation, i.e., the angle of rotation between the smallest flow cross section (lowest possible flow) and maximum flow cross section (maximum flow) ranges in particular from 130° to 170°, preferably from 140° to 160°, and especially preferably measures 150°.

Another embodiment of the distribution valve according to the invention provides that the flowmeter body is mounted in the second housing part so that it can rotate around a second rotational axis between an initial position and an end position. The initial position is the position of the flowmeter body relative to the second housing part, in which the flowmeter body receives no flow, since the connection between the main pipe and first housing part is closed—the regulating cock is then in the closed position. The end position of the flowmeter body relative to the second housing part is the position corresponding to the maximum inflow or flow rate when the connection between the main pipe and first housing part is completely released—the regulating cock is then in the open position.

In another embodiment, the flowmeter body exhibits a paddle that extends into the secondary flow channel, so as to make the flowmeter body able to receive a flow of medium and move between the initial position and end position. As mentioned, the secondary flow channel involves the flow channel or flow path starting with the branch in the main pipe, which extends through the first housing part and regulating cock, as well as through the second housing part up to the third conduit pipe connection, in particular to the connection to the heating circuit. The paddle receives or is entrained by the flow in the initial position, and then moves in the direction of the end position through a section of the secondary flow channel formed in a second housing part. The flowmeter unit can now be designed as follows, so that the flow rate can be displayed.

In an embodiment of the distribution valve, the second housing part can be provided with a holding fixture for a cover. Accordingly, a cover can be provided in the holding fixture. The holding fixture can be provided with a female thread, and the cover with a corresponding male thread, and/or the holding fixture can be provided with a male thread, and the cover with a corresponding female thread. A threaded joint could conceivably be replaced by a bayonet fitting, a closure with a safety catch or the like. In order to be screwed into the holding fixture, the outside of the cover can be provided with a joint, in particular a recessed engagement, for a tool, for example with a hexagon socket or the like.

In order to seal the interior of the second housing part away from the environment, a third sealing element, e.g., a third sealing ring, can be provided between the cover and second housing part, which can be held in a groove in the cover and/or second housing part. At least sections of the cover and/or second housing part can be transparent, wherein the transparent area exhibits a scale.

The flowmeter body can further exhibit a pointer, which is visible through the transparent area of the cover and/or second housing part provided with the scale. The pointer can be designed as such, i.e., have a three-dimensional shape with a point, or consist of an optical marking, for example on a disk.

The paddle is preferably connected in a torque-proof manner with the pointer, and in particular designed as a single piece (integrally). In this way, a flow-induced movement of the paddle is imparted to the pointer with simple means, as a result of which the scale in the transparent area can be used to determine the position of the pointer relative to the initial position and end position.

In an embodiment of the distribution valve, an in particular rotationally symmetrical disk is arranged between the paddle and pointer, wherein the rotational axis of the disk is identical to that of the second angle of rotation of the flowmeter body. In particular, the disk can be designed as a single piece (integrally) with the paddle and/or pointer. The disk can cover the secondary flow channel in the second housing part toward the pointer or toward the space in the second housing part in which the pointer moves, so that the pointer is located and movable between the disk and transparent area, for example the transparent area of the cover. The disk here closes the secondary flow channel in the second housing part at least to an extent where dirt particles cannot accumulate to any appreciable degree in the space in which the pointer moves. However, it is especially preferred that the disk allow the space in which the pointer moves to also be filled with the medium. But the flow passing through the display area is nonexistent, or at least not appreciable. The same pressure here preferably prevails between the secondary flow channel in the second housing part, i.e., the flow area in which the paddle can move between the initial position and end position, and the display area, i.e., the area in which the pointer can move, meaning that the flowmeter body is depressurized.

It was exemplarily described above that the pointer of the flowmeter body can be spaced apart from the paddle in the axial direction (axial direction of the flowmeter body). However, it is basically also conceivable for the pointer to be provided on the paddle in an axial direction or even in a radial direction. If the pointer is provided on the paddle in a radial direction, for example, in the form of a marking, wherein the paddle itself can even comprise the pointer, the transparent area that exhibits the scale preferably lies in the in particular internally cylindrical lateral wall of the second housing part.

In another embodiment of the distribution valve according to the invention, the second housing part incorporates a spring, in particular a leg spring, which abuts at one end (spring end) against the second housing part and at the other end (spring end) against the flowmeter body, in particular against the paddle, and preloads the paddle opposite the flow direction that runs along the secondary flow channel in the second housing part. In particular, the preload is here large enough to hold the paddle in the initial position while not exposed to a flow, meaning when the regulating cock is in the closed position. When the paddle is then exposed to a flow, the medium impacts the paddle, and there exerts a force that causes the paddle to move against the spring force through the part of the secondary flow channel between the initial position and end position, specifically until such time that an equilibrium is established between the force exerted on the paddle by the flowing medium and the spring force.

As already described above, part of the secondary flow channel runs through the second housing part. This part of the secondary flow channel is referred to below as the flowmeter flow channel.

In a further embodiment of the distribution valve according to the invention, the second housing part exhibits a flowmeter flow channel, which has a first, in particular straight, section and an adjoining second, curved section, wherein the paddle is arranged at the start of the second section or end of the first section in the initial position of the flowmeter body, and can move around the second rotational axis in the second section in the direction of the end position when exposed to a flow of medium. The scale here indicates the angle of rotation, which is proportional to the flow rate. The angle of rotation of the paddle around the second rotational axis in particular exceeds 90°, preferably exceeds 135°, and especially preferably exceeds 180°. A finely graduated measuring range can be created in this way.

In another embodiment, the cross section of the flowmeter flow channel in the second section expands from the initial position in the direction of the end position, specifically in particular in a radial direction (radial direction relative to the second rotational axis) and/or in an axial direction (in the direction of the second rotational axis). In the latter case, the floor of the flowmeter flow channel can be designed as an inclined plane, i.e., the further away the paddle moves from the initial position in the direction of the end position, the larger the gap between the paddle and floor of the flowmeter flow channel becomes. This inclined plane is preferably designed in such a way that the rotational movement of the paddle is proportional to the flow rate. As mentioned, however, the gap can in a similar manner additionally or alternatively also become larger to the side of the paddle by virtue of the fact that the radially outer lateral wall of the flowmeter flow channel has no precisely circular contour in the area between the initial position and end position, but rather moves increasingly away from the second rotational axis from the initial position in the direction of the end position, as a result of which the distance between the radially outer edge of the paddle and aforesaid lateral wall of the flowmeter flow channel becomes correspondingly larger as the paddle moves from the initial position in the direction of the end position. The lateral and lower boundary surface could also form a constant gap relative to the paddle. The flow cross section could then be comprised of an enlarging groove in the boundary surfaces.

In yet another embodiment of the distribution valve according to the invention, the second housing part and/or flowmeter flow channel exhibits a stop for the paddle and/or pointer, which defines the initial position. The paddle and/or pointer is pressed against this stop by the preload of the spring. In this position, the pointer preferably indicates "0" in the scale, i.e., the flow rate is zero.

In an embodiment, the flowmeter flow channel is bordered by the disk, in particular by the rotationally symmetrical disk, of the flowmeter body toward the holding fixture of the cover (or toward the cover). The floor of the flowmeter flow channel lying opposite the disk along with its lateral walls are then in particular formed by the material of the second housing part, meaning are designed as a single piece with the remaining second housing part.

Another embodiment of the distribution valve according to the invention provides that the first rotational axis runs at an angle, in particular perpendicular, to the second rotational axis and/or the first rotational axis runs at an angle, in particular perpendicular, to the main flow direction in the main pipe and/or the second rotational axis runs at an angle, in particular perpendicular, to the main flow direction in the main pipe. This yields an especially streamlined progression.

In particular, the flow progression in the distribution valve according to the invention is as follows:

If the valve body, in particular the regulating cock, is in the closed position, the entire medium flows from the first conduit pipe connection through the main pipe by the (closed) branch to the second conduit pipe connection.

If the valve body, in particular the regulating cock, is in a position that does not close the branch in the main pipe, in particular in the open position or an intermediate position, part of the medium flowing through the main pipe flows radially out of the main pipe via the branch into the first housing part, and from there into the cock channel. In the cock channel, the medium is diverted in particular in an axial direction (axial direction of the regulating cock), and flows in the direction of the first rotational axis through the outlet of the first housing part to the second housing part. In the second housing part, the medium gets into the flowmeter flow channel, where it hits the paddle and causes the flow rate to be displayed. The medium finally leaves the second housing part through the third conduit pipe connection. From there, the medium can be guided into a heating circuit.

The distribution valve according to the invention with integrated flowmeter unit represents a marked simplification of measurement technology. Installing (putting together) the distribution valve is also easier than in prior art. Assembly is self-explanatory, and can also be performed by laypeople, since in particular only plugging and screwing are involved here. Fewer components also means less potential for errors during operation. Pressure loss in the system is also minimized in comparison to prior art by the streamlined shape in the first housing part and second housing part. The transparent area, also referred to as gage glass, of the flowmeter unit is less susceptible to contamination, primarily due to the large gap dimensions, which in turn also results in fewer malfunctions, e.g., a standstill/jamming of the pointer. The distribution valve according to the present invention also requires no maintenance.

Figure 2:
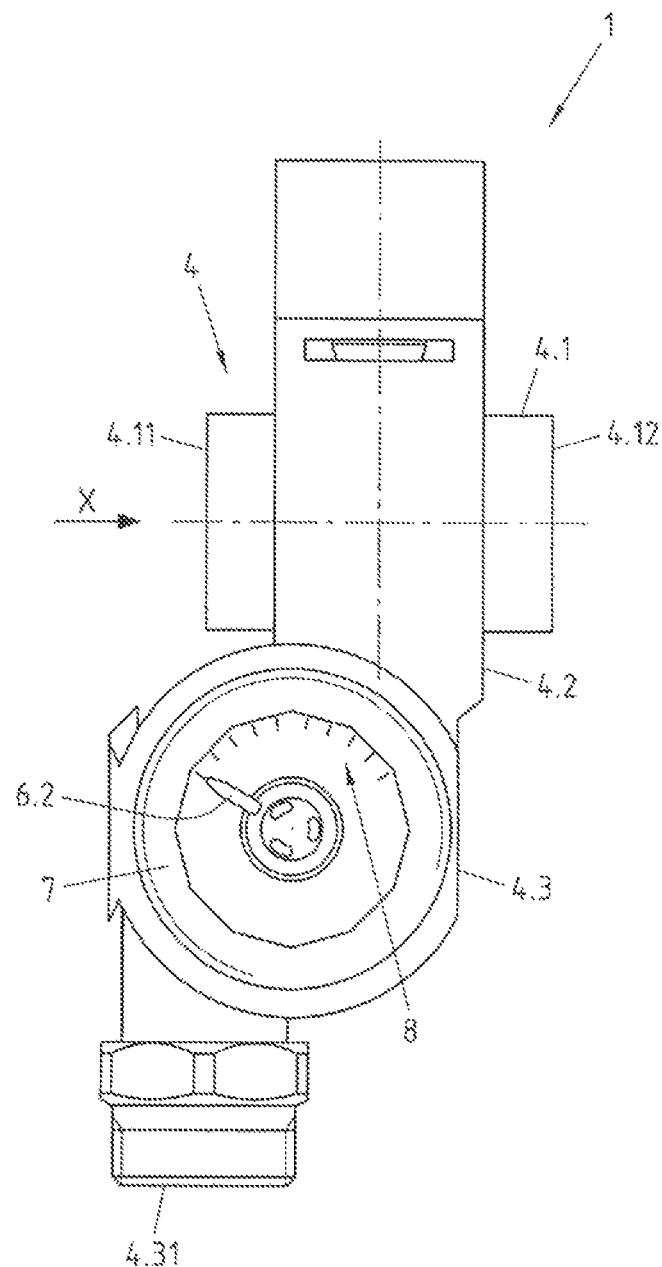
Figure 3A:
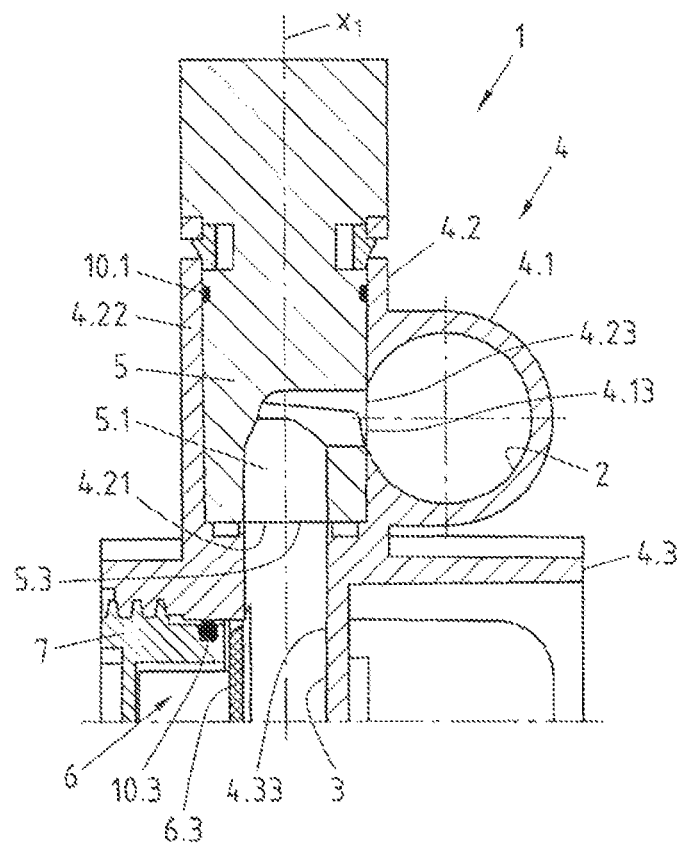
Figure 4A:
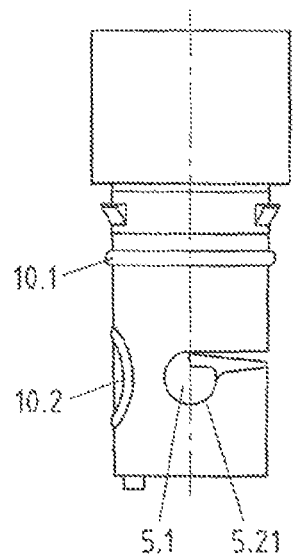
Figure 5A:
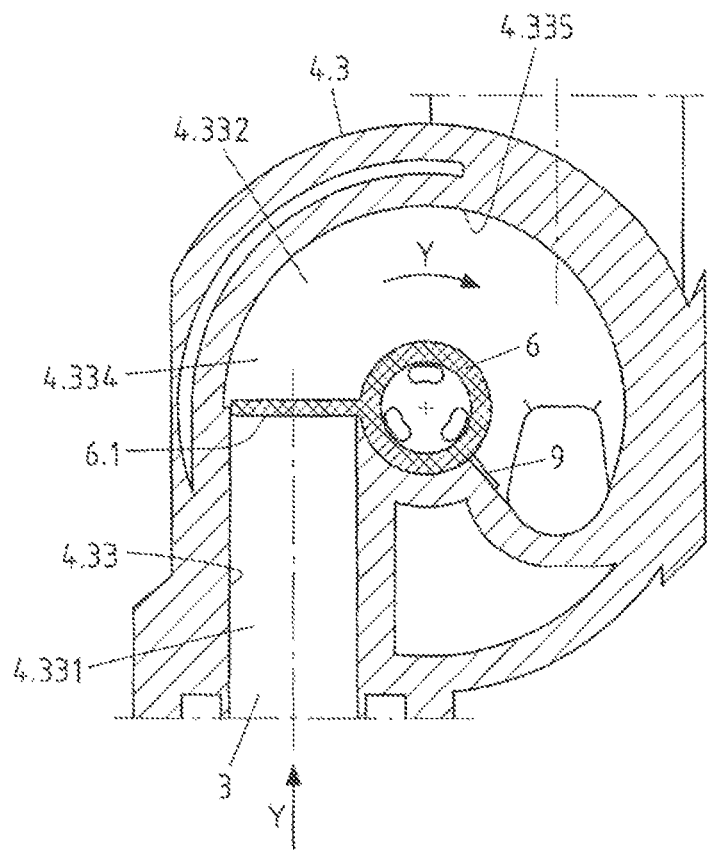
Figure 5B:
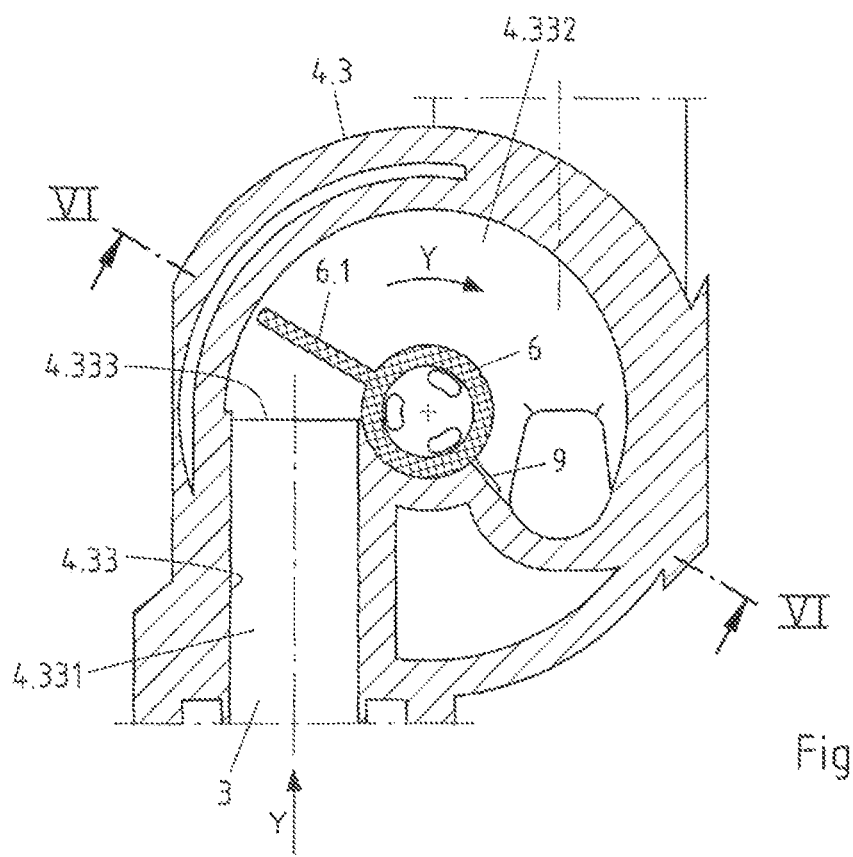
Figure 6:
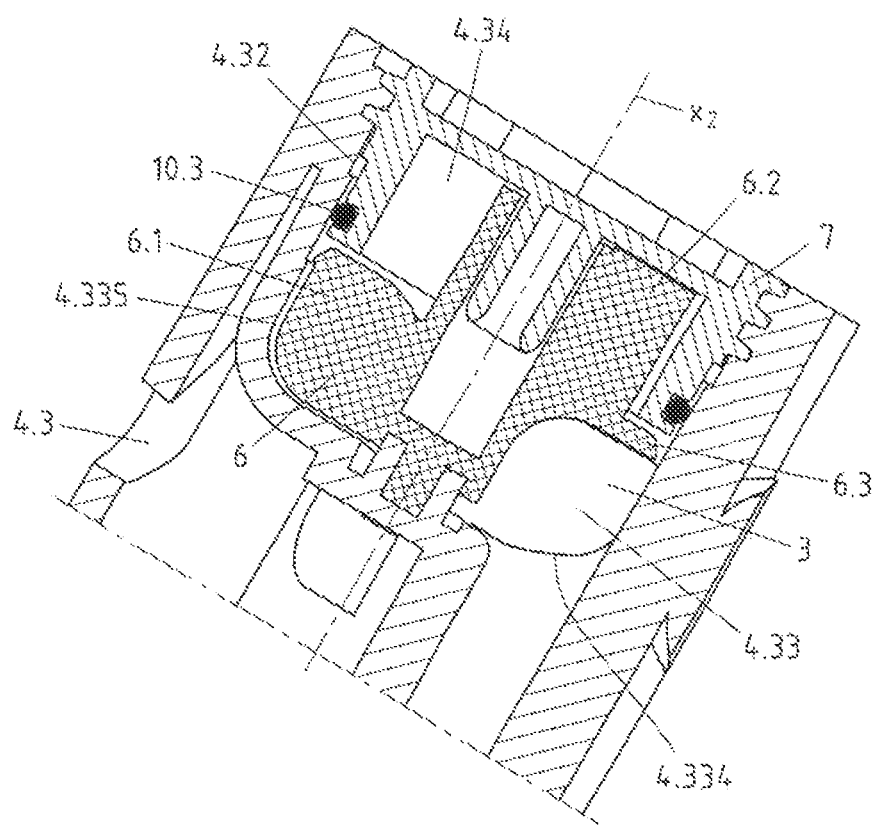
Figure 7A:
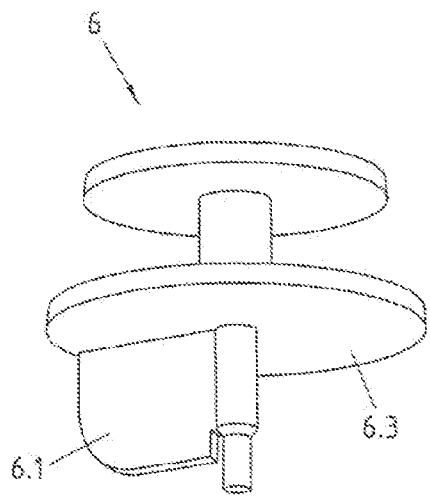
Figure 7B:
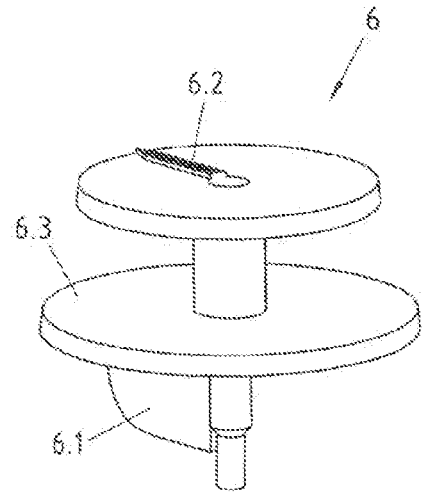

There are now a plurality of possibilities for configuring and further developing the distribution valve according to the invention. In this regard, let reference be made on the one hand to the claims following claim 1, and on the other hand to the description of exemplary embodiments in conjunction with the drawing. The drawing shows:

FIG. 1 a perspective view of a distribution valve according to the invention, FIG. 2 a side view of the distribution valve according to FIG. 1, FIG. 3a) to c) partial sectional views of the distribution valve according to FIG. 1, FIG. 4a) to d) side views of a regulating cock for a distribution valve according to FIG. 1, FIGS. 5a) and b) sectional views of a flowmeter unit of a distribution valve according to FIG. 1, FIG. 6 a sectional view of the flowmeter unit from FIG. 5b) along the cutting line VI-VI, and FIG. 7a) to d) perspective views of different exemplary embodiments of a flowmeter body for a distribution valve according to FIG. 1.

The distribution valve 1 with integrated flowmeter unit exemplarily shown on the attached figures exhibits a main flow channel 2 through which a medium, for example water, can flow in a main flow direction X, and a secondary flow channel 3 branching away from the latter.

The distribution valve 1 exhibits a distribution valve housing 4 shown in perspective on FIG. 1, which contains a main pipe 4.1 with a first conduit pipe connection 4.11, a second conduit pipe connection 4.12, and a branch 4.13 lying in between (see FIG. 3a) to c)), wherein the main flow channel 2 in the main pipe 4.1 runs from the first conduit pipe connection 4.11 to the second conduit pipe connection 4.12. The first and second conduit pipe connections 4.11 or 4.12 can each be joined with a line system and/or one or more additional distribution valves. Correspondingly, the present invention also relates to a connection device, in particular a line system, with one or more distribution valves, of which at least one distribution valve 1 is designed according to the invention.

The distribution valve housing 4 further contains a first housing part 4.2 for accommodating a valve body 5, wherein the branch 4.13 empties into the first housing part 4.2 (FIG. 3a) to c)) and establishes a fluid connection between the main pipe 4.1 and first housing part 4.2, and wherein the first housing part 4.2 exhibits an outlet 4.21 (FIG. 3a) to c)). The first housing part 4.2 is here situated tangentially outside on the main pipe 4.1.

The distribution valve housing 4 further contains a second housing part 4.3 for accommodating a flowmeter body 6. The outlet of the first housing part 4.2 empties into the second housing part 4.3 (FIG. 3a) to c)), thereby establishing a fluid connection between the first housing part 4.2 and second housing part 4.3. The second housing part again exhibits an outlet, which forms a third conduit pipe connection 4.31, and is used for connection to a heating circuit, for example.

The structural design of the distribution valve 1 is such that the secondary flow channel 3 runs from the branch 4.13 of the main pipe 4.1 to the outlet 4.31 of the second housing part 4.3. The secondary flow channel 3 thus branches away from the main flow channel 2.

As indicated above, the distribution housing 4 consists of the main pipe 4.1, first housing part 4.2 and second housing part 4.3 including conduit pipe connections 4.11, 4.12 and 4.31 as a single piece, and in particular yields an injection molded part made out of plastic.

Figure 3B:
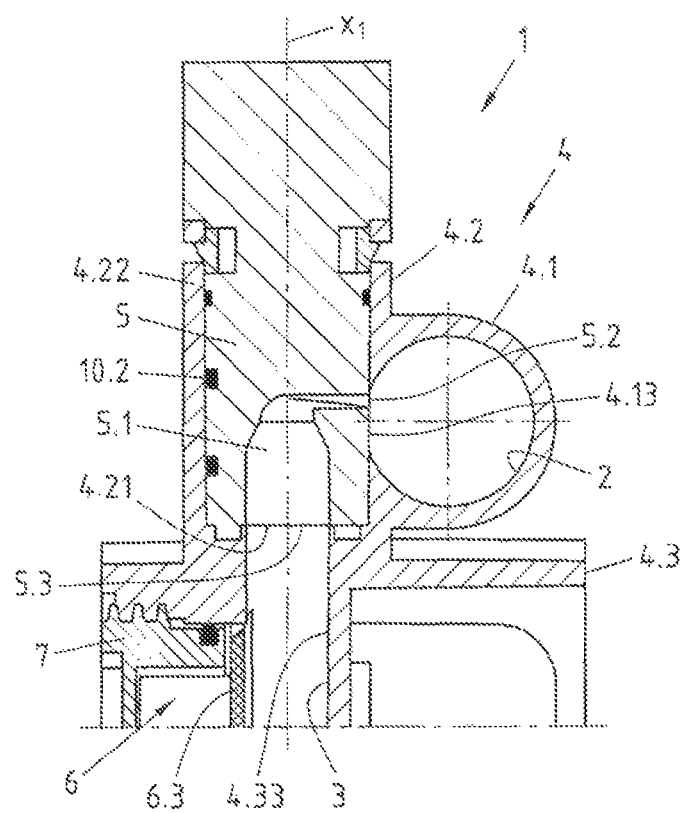
Figure 3C:
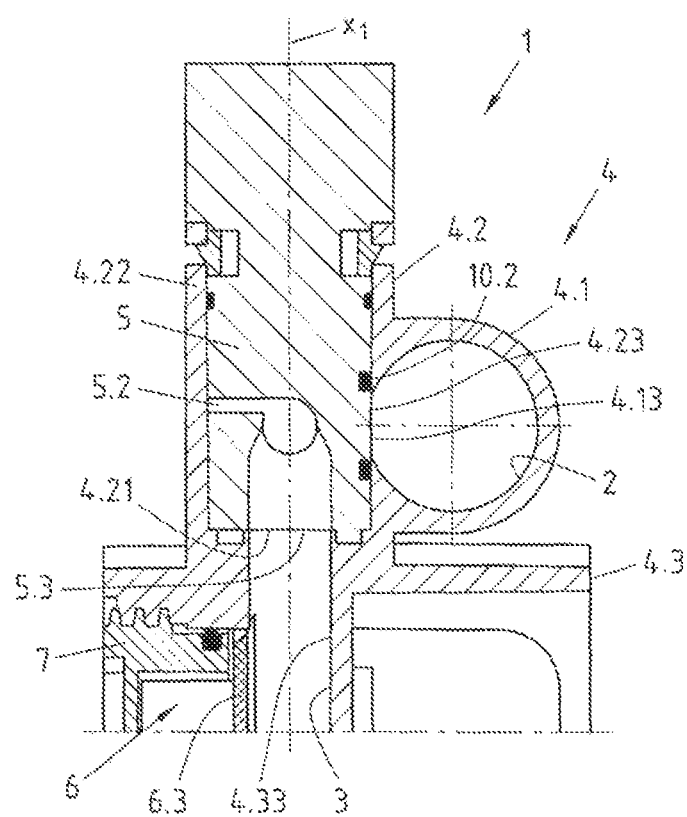

As depicted on FIG. 3a) to c), a regulating cock 5, here a component with an essentially cylindrical outer contour, is mounted in the first housing part 4.2 as the valve body so that it can turn around a first rotational axis $x_1$ between an open position (FIG. 3a)) and a closed position (FIG. 3c)). Situated between the open position and closed position are intermediate positions, one of which is shown on FIG. 3b), and in which a lower flow of medium from the main pipe 4.1 into the first housing part 4.2 is present than in the open position.

As depicted on FIG. 3a) to c), a first sealing element, for example here in the form of a first sealing ring 10.1, in particular an O-ring, is situated above the branch 4.13 and inlet 4.23 between the first housing part 4.2 and regulating cock 5, extending over the entire periphery of the regulating cock 5. The latter seals the interior of the first housing part 4.2 away from the environment.

A second sealing element, for example here in the form of a second sealing ring 10.2, envelops a location on the periphery of the regulating cock 5 that closes off the branch 4.13 and inlet 4.23 in the closed position (FIG. 3c)).

As depicted on FIG. 3a) to c), the first housing part 4.2 exhibits a wall 4.22, the interior of which at least regionally has a cylindrical surface. The regulating cock 5 abuts against the cylindrical part of the wall 4.22 on the interior, and can be moved relative to the latter or guided along the latter.

The wall 4.22 exhibits an opening 4.23, which forms the inlet 4.23 for the medium branched away from the main pipe 4.1. In the present exemplary embodiment, the opening 4.23 is identical to the opening 4.13 that here comprises the branch from the main pipe 4.1.

The regulating cock 5 further exhibits a cock channel 5.1, which extends from a radial opening 5.2 in the regulating cock 5 to an axial opening 5.3 in the regulating cock. With the regulating cock 5 at least in the open position, and preferably also in the closed position, the axial opening 5.3 aligns with the outlet 4.21 of the first housing part 4.2. The radial opening 5.2 aligns with the inlet 4.23 in the open position. In the closed position, the regulating cock 5 closes the inlet 4.23 of the first housing part 4.2 liquid-tight.

As depicted on FIG. 4a) to d), the radial opening 5.2 of the regulating cock 5 has an incompletely circular and simultaneously asymmetrical cross section, which tapers more toward one side than toward the other side in the direction of the periphery of the regulating cock 5. The radial opening 5.2 exhibits a first section 5.21 with a round contour, which corresponds to approximately ¾ of a circle, the diameter of which is essentially identical to the diameter of the opening 4.23 of the first housing part 4.2. The first section 5.21 is adjoined by a second section 5.22, which has a slit-like design, and in which the edges of the opening 5.2 move straight toward each other in the direction from the first section 5.21 to the end of the second section 5.22. The cross section of the radial opening 5.2 in the regulating cock 5 extends over about half the periphery of the regulating cock 5, as illustrated by FIGS. 4a) and d).

Figure 4B:
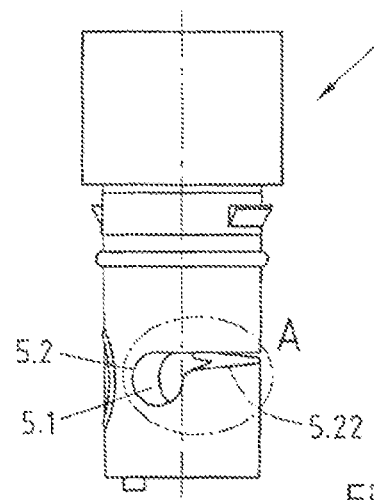
Figure 4C:
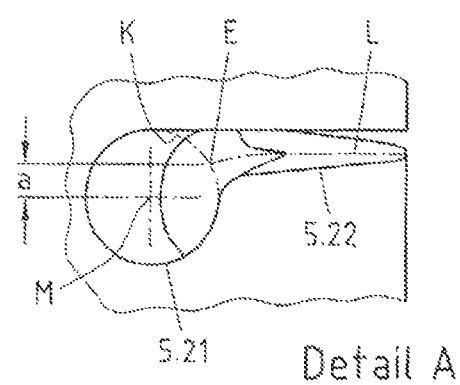
Figure 4C:
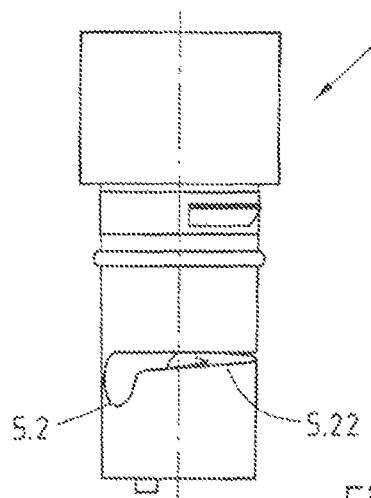
Figure 4D:
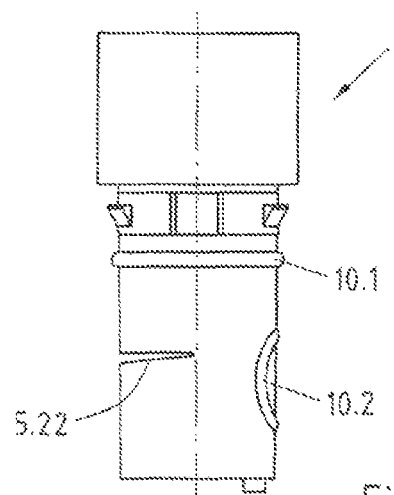

In the case shown (see "detail A" on FIG. 4b)), a misalignment a exists in the axial direction of the regulating cock 5 or in the direction parallel thereto between the midpoint M of the first section 5.21 (i.e., here the midpoint M of circle line K, on which runs the round contour of the first section 5.21) and the front end E of the middle line L of the second section 5.22. The front end E of the middle line L is defined as the point in which the middle line L of the second section 5.22 meets the circle line K on which runs the round contour of the first section 5.21. The front end E of the middle line L is here offset relative to the midpoint M of the first section 5.21 in a direction facing away from the axial opening 5.3 in the regulating cock 5 and runs parallel to the rotational axis $x_1$. Therefore, if the rotational axis $x_1$ of the regulating cock 5 runs in the gravitational direction with the distribution valve 1 properly installed (FIG. 1), and if the second housing part 4.3 is situated behind (under) the first housing part 4.2 as in the present exemplary embodiment, the front end E of the middle line L is offset relative to the midpoint M opposite the gravitational direction. In the exemplary embodiment shown, the entire second section

5.22 even lies in the direction parallel to the first rotational axis $x_1$ and pointing toward the axial opening 5.3 (here in the gravitational direction with the distribution valve properly installed) before the midpoint M of the first section 5.21, meaning above the midpoint M of the first section 5.21.

FIGS. 5a), 5b) and 6 show the integrated flowmeter unit of the distribution valve 1. According to the invention, the second housing part 4.3 incorporates a flowmeter body 6 with a paddle 6.1, a pointer 6.2 spaced apart therefrom in the axial direction, and a rotationally symmetrical disk 6.3 arranged between the paddle 6.1 and pointer 6.2. The flowmeter body 6 is mounted so that it can turn around a second rotational axis $x_2$ (which defines the axial direction) between an initial position (FIG. 5a)) and an end position. FIG. 5b) depicts the partial flow of a medium through the second housing part 4.3.

Figure 7C:
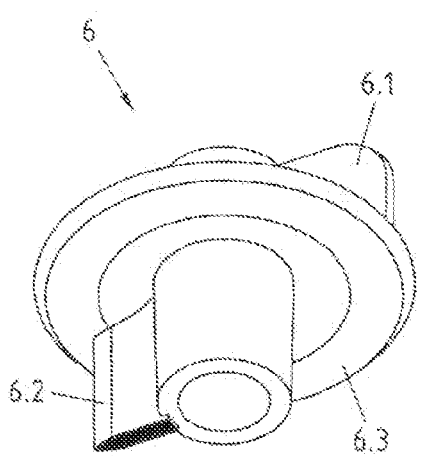
Figure 7D:
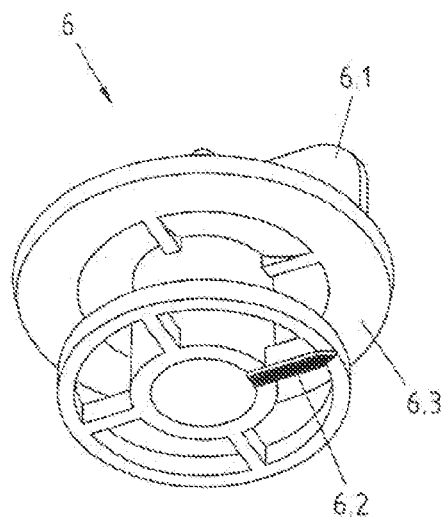

As depicted on FIG. 7a) to d), the paddle 6.1, pointer 6.2 and disk 6.3 are connected with each other as a single piece in a torque-proof manner. FIG. 7c) here shows an exemplary embodiment of a flowmeter body 6 of the kind provided in the example on FIGS. 5a) to 6. FIG. 7a), b) and d) present alternative exemplary embodiments of a flowmeter body 6.

As depicted on FIG. 6 and partially also on FIG. 3a) to c), the second housing part 4.3 is provided with a holding fixture 4.32 for a cover 7, wherein the cover 7 used here has a male thread, and the holding fixture 4.32 has a corresponding female thread. Situated between the cover 7 and holding fixture 4.32 is a third sealing element, here for example in the form of a third sealing ring 10.3, which seals the interior of the second housing part 4.3 away from the environment.

The word "sealing" as used in the present specification is always intended to mean a liquid-tight seal, which is at least tight enough to prevent medium from exiting at the sealing points at the normal test pressure in a line system, for example a floor heater.

Sections of the cover 7 are transparent in design, wherein the transparent area exhibits a scale 8. When the medium flows toward the paddle 6.1, it moves between the initial position and end position, simultaneously imparting the movement to the pointer 6.2, which is made visible by the transparent area, and displays the value corresponding to the flow rate at this point in time on the scale 8.

Further situated in the second housing part 4.3 is a spring 9, in particular a leg spring, which abuts at one end against the second housing part 4.3, and at the other end against the flowmeter body 6, here against its paddle 6.1. The spring 9 preloads the paddle 6.1 opposite the flow direction Y present in the second housing part 4.3. The preload is selected in such a way as to hold the paddle 6.1 in the initial position and press it against a stop 4.333 when not exposed to a flow.

As shown in particular on FIGS. 5a) and b), a flowmeter flow channel 4.33 is provided in the second housing 4.3 as part of the secondary flow channel 3, which exhibits a first, straight section 4.331 adjoined by a second, curved section 4.332. The stop 4.333 is located between the first section 4.331 and second section 4.332. When not exposed to a flow, the paddle, as depicted on FIG. 5a), is situated at the stop 4.333, which defines the initial position. As the flow increases, the paddle 6.1 moves around the second rotational axis $x_2$ of the flowmeter body 6 in the direction of the end position (a clockwise movement in the present exemplary embodiment).

As evident in particular from FIG. 6, the cross section of the flowmeter flow channel 4.33 expands from the initial position in the direction of the end position, because the floor 4.334 of the flowmeter flow channel 4.33 forms an inclined plane, i.e., declines in the direction toward the end position. As a result, a gap between the paddle 6.1 and floor 4.334 enlarges as the paddle 6.1 continues to swing in the direction of the end position. A small, uniform gap is also provided between the paddle 6.1 and radially outer wall 4.335 of the flowmeter flow channel 4.33, which further optimizes the flow conditions.

FIG. 6 shows how the disk 6.3 of the flowmeter body 6 borders the flowmeter flow channel 4.33 in the direction of the cover 7 and separates it from a space 4.34 in which the pointer 6.2 moves. This prevents dirt particles from being able to get from the flow area, i.e., the flowmeter flow channel 4.33, into the area in which the pointer 6.2 moves, i.e., the space 4.34, and in so doing contaminate this space 4.34 and in particular the transparent cover 7 provided with the scale 8. This also prevents dirt from in this way inadvertently jamming the flowmeter body 6.

As already explained above, FIG. 7a) to d) depict various exemplary embodiments of a flowmeter body 6. Let it again be emphasized at this juncture that the pointer 6.2 can take the form of a three-dimensional component (FIG. 7c)), or consist of a marking (FIGS. 7a), b), and d)). The pointer 6.2 is then visible through the transparent area of the cover 7 (gage glass), and displays the flow rate on the scale 8.

The invention claimed is:

1. A distribution valve with an integrated flowmeter unit, which includes a main flow channel through which a medium can flow in a main flow direction, and a secondary flow channel, which branches away from the main flow direction, said distribution valve comprising:
    a distribution valve housing;
    at least one valve body; and
    a flowmeter body;
    wherein the distribution valve housing comprises a main pipe with a first conduit pipe connection, a second conduit pipe connection and at least one branch lying between the first conduit pipe connection and the second conduit pipe connection,
    wherein the main flow channel is defined by the main pipe and runs from the first conduit pipe connection to the second conduit pipe connection,
    wherein the distribution valve housing further comprises a first housing part for accommodating the at least one valve body,
    wherein the first housing part includes a wall with an opening, which forms an inlet for the medium to branch away from the main pipe at the branch,
    wherein the branch empties into the first housing part and forms a fluid connection between the main pipe and the first housing part,
    wherein the first housing part includes an outlet,
    wherein the distribution valve housing further comprises a second housing part for accommodating the flowmeter body,
    wherein the outlet of the first housing part empties into the second housing part and establishes a fluid connection between the first housing part and the second housing part,
    wherein the second housing part includes an outlet that forms a third conduit pipe connection,
    wherein the secondary flow channel runs from the branch of the main pipe to the outlet of the second housing part,
    wherein
    the branch of the main pipe is formed by an opening in the main pipe, and the opening of the main pipe is identical with the opening of the first housing part which forms the inlet, or the branch of the main pipe is formed by an opening in the main pipe together with a line segment, wherein the line segment is provided between the opening of the first housing part forming the inlet and the opening in the main pipe as connection between the main pipe and the first housing part wherein the at least one valve body is in the form of a regulating cock, which is mounted in the first housing part so as to be rotatable on a first rotational axis ($x_1$) between a closed position and open position, and wherein the regulating cock includes a cock channel, which extends from a radial opening in the regulating cock to an axial opening in the regulating cock, wherein the axial opening in the regulating cock aligns with the outlet of the first housing part, wherein the radial opening in the regulating cock aligns with the inlet of the first housing part in the open position of the regulating cock, and wherein the regulating cock closes the inlet of the first housing part completely in the closed position of the regulating cock.

2. The distribution valve according to claim 1, wherein the first housing part and the second housing part of the distribution valve housing are integrally formed together.

3. The distribution valve according to claim 1, wherein the distribution valve housing and/or the valve body and/or the flowmeter body are formed of injection-molded plastic.

4. The distribution valve according to claim 1, wherein the wall of the first housing part comprises, at least in some regions, an interior cylindrical surface against which the regulating cock abuts and along which the regulating cock is guided.

5. The distribution valve according to claim 1, wherein the radial opening in the regulating cock has an uneven and/or asymmetrical cross section.

6. The distribution valve according to claim 5, wherein the cross section of the radial opening in the regulating cock extends over at least one fourth of a periphery of the regulating cock.

7. The distribution valve according to claim 1, wherein the flowmeter body is mounted in the second housing part so as to be rotatable on a second rotational axis between an initial position and an end position.

8. The distribution valve according to claim 7, wherein the flowmeter body includes a paddle that extends into the secondary flow channel.

9. The distribution valve according to claim 8, wherein the second housing part is provided with a holding fixture for a cover.

10. The distribution valve according to claim 9, wherein the cover and/or the second housing part are transparent at least in one or more areas, and wherein a scale is viewable through the one or more transparent areas.

11. The distribution valve according to claims 10, wherein the flowmeter body includes a pointer, which is visible through the one or more transparent areas of the cover and/or second housing part relative to the scale.

12. The distribution valve according to claims 11, wherein the paddle is connected with the pointer in non-rotatable manner.

13. The distribution valve according to claim 11, wherein a rotationally symmetrical disk is arranged between the paddle and pointer.

14. The distribution valve according to claim 8, further comprising a leg spring, which abuts at one end against the second housing part and at an other end against the paddle, and preloads the paddle opposite a medium flow direction through the second housing part.

15. The distribution valve according to claim 14, wherein the preloading is sufficient to hold the paddle in the initial position when no medium is flowing in the medium flow direction through the second housing part.

16. The distribution valve according to claim 8, wherein the second housing part exhibits a flowmeter flow channel that has a first straight section and an adjoining second curved section, wherein the paddle is arranged at a start of the second section in the initial position of the flowmeter body, and is configured to rotate on the second rotational axis in the second section in a direction of an end position when exposed to a flow of medium.

17. The distribution valve according to claim 16, wherein a cross section of the flowmeter flow channel in the second section expands from the initial position in the direction of the end position.

18. The distribution valve according to claim 16, wherein the flowmeter flow channel includes a stop for the paddle and/or pointer, which defines the initial position.

19. The distribution valve according to claim 16, wherein the flowmeter flow channel is bordered by a disk of the flowmeter body toward a holding fixture of the cover.

20. The distribution valve according to claim 7, wherein the first rotational axis runs perpendicular to the second rotational axis and/or the first rotational axis runs perpendicular to the main flow direction in the main pipe and/or the second rotational axis runs perpendicular to the main flow direction in the main pipe.

* * * * *

UNITED STATES PATENT AND TRADEMARK OFFICE
CERTIFICATE OF CORRECTION

PATENT NO. : 9,851,229 B2  
APPLICATION NO. : 14/766683  
DATED : December 26, 2017  
INVENTOR(S) : Marcel Gille et al.

Page 1 of 1

It is certified that error appears in the above-identified patent and that said Letters Patent is hereby corrected as shown below:

In the Claims

In Column 14, Line 5,   Change "claims" to --claim--

In Column 14, Line 9,   Change "claims" to --claim--

In Column 14, Line 10,  Insert --a-- between "in" and "non-rotatable"

Signed and Sealed this  
Twelfth Day of June, 2018

Andrei Iancu  
*Director of the United States Patent and Trademark Office*